United States Patent
Dodds et al.

(10) Patent No.: US 11,616,580 B1
(45) Date of Patent: *Mar. 28, 2023

(54) LOCAL AUDITORY DISPLAY USING ULTRASONIC ENCODING AND DECODING

(71) Applicant: Meta Platforms Technologies, LLC, Menlo Park, CA (US)

(72) Inventors: Peter Harty Dodds, Seattle, WA (US); Morteza Khaleghimeybodi, Bellevue, WA (US); Philip Robinson, Seattle, WA (US); Scott Phillips Porter, Woodinville, WA (US); William Owen Brimijoin, II, Kirkland, WA (US); Andrew Lovitt, Redmond, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/739,425

(22) Filed: May 9, 2022

Related U.S. Application Data

(63) Continuation of application No. 16/230,687, filed on Dec. 21, 2018, now Pat. No. 11,368,231.

(51) Int. Cl.
*H04B 11/00* (2006.01)
*G06F 3/16* (2006.01)

(52) U.S. Cl.
CPC ............. *H04B 11/00* (2013.01); *G06F 3/165* (2013.01)

(58) Field of Classification Search
CPC ................................ H04B 11/00; G06F 3/165
See application file for complete search history.

(56) References Cited

U.S. PATENT DOCUMENTS

| | | | | |
|---|---|---|---|---|
| 4,039,999 A | * | 8/1977 | Weston | H04B 14/006 |
| | | | | 128/201.27 |
| 5,539,705 A | | 7/1996 | Akerman et al. | |
| 6,426,919 B1 | * | 7/2002 | Gerosa | G10L 21/0364 |
| | | | | 367/132 |
| 10,638,248 B1 | | 4/2020 | Dodds et al. | |
| 10,897,570 B1 | | 1/2021 | Robinson et al. | |
| 11,368,231 B1 | * | 6/2022 | Dodds | G06F 3/165 |

FOREIGN PATENT DOCUMENTS

| | | |
|---|---|---|
| CN | 113366864 A | 9/2021 |
| KR | 20210110690 A | 9/2021 |

* cited by examiner

*Primary Examiner* — Daniel Pihulic
(74) *Attorney, Agent, or Firm* — Fenwick & West LLP

(57) ABSTRACT

A system receives audio data in a frequency range of 20 Hz-20 kHz. The received audio data is encoded by the system into ultrasonic data in frequencies that are greater than 20 kHz, and transmitted into a local area that is proximal to the transmitting device, i.e., within the transmission range of the transmitting device. An ultrasonic communication device that is located in the transmission range of the transmitting device may receive the ultrasonic data. The received ultrasonic data is decoded by the ultrasonic communication system in the receiving device into audio data in a frequency range of 20 Hz-20 kHz, and subsequently presented to a user of the receiving ultrasonic communication device.

19 Claims, 6 Drawing Sheets

ULTRASONIC COMMUNICATION DEVICE
100

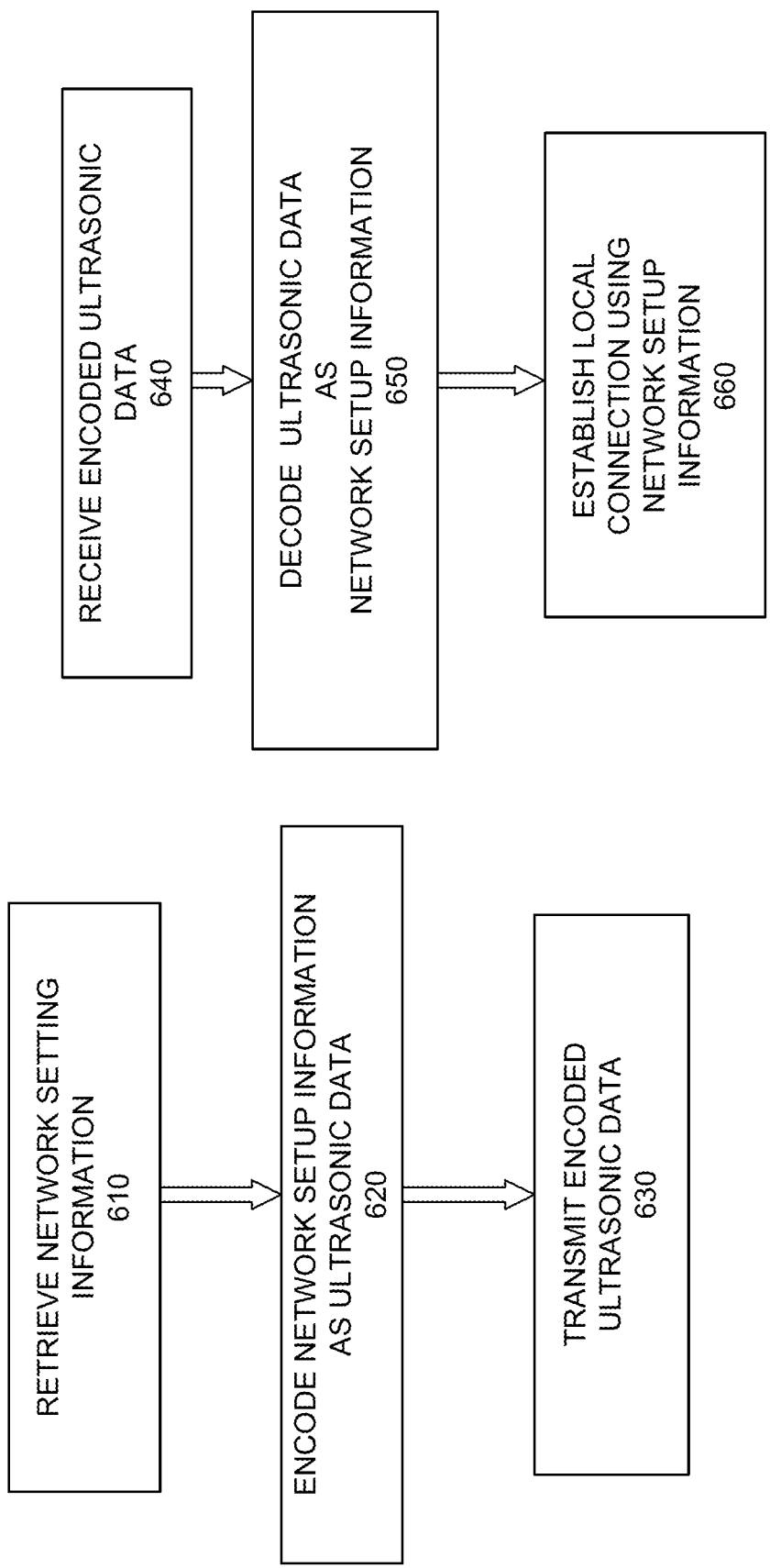

LOCAL AUDITORY DISPLAY USING ULTRASONIC ENCODING AND DECODING

CROSS REFERENCE TO RELATED APPLICATIONS

This application is a continuation of co-pending U.S. application Ser. No. 16/230,687, filed Dec. 21, 2018, which is incorporated by reference in its entirety.

BACKGROUND

The present disclosure relates to localized auditory display, and specifically relates to using ultrasonic encoding to perform localized acoustic data communication.

Conventional acoustic systems utilize a "one-to-many" model for transmitting audio data over the air to a user within a local area. In this model, audio data from a single acoustic source is transmitted to any receiver in the source's field of propagation. An example of this is a speaker at a microphone addressing an audience. Transmitting audio data over air for a user within a local area while minimizing the exposure of others in the local area to that audio data is difficult due to a lack of control over far-field radiated audio signal data. It is desirable to dynamically customize acoustic data to a user within their local environment, thus enabling a "one-to-one" transmission model in which the user may receive a personalized audio stream over the air that is undetectable by other users who have not "opted-in" to receive that stream.

SUMMARY

An ultrasonic communication system facilitates transmission and reception of customized and localized ultrasonic data for either receiving or transmitting acoustic data. In some embodiments, the system may be part of a headset (e.g., near-eye display or a head-mounted display). The system described herein facilitates localized auditory communication using ultrasonic (acoustic data with an ultrasonic frequency, i.e., any frequency that is greater than 20 kHz) encoding to transmit information acoustically between users wearing ultrasonic communication devices without audio transmission to other nearby individuals. In some embodiments, the system may also provide customized transmission based on specified settings.

The system receives audio data in a human audible frequency, i.e., any frequency in the range of 20 Hz-20 kHz. The received audio data is encoded by the system into ultrasonic data in frequencies that are greater than 20 kHz, and transmitted into a local area, i.e., an area that is proximal to the transmitting device, i.e., within the transmission range of the transmitting ultrasonic communication device. An ultrasonic communication device that is located in the transmission range of the transmitting device may receive the ultrasonic data. The received data is decoded by the ultrasonic communication system in the receiving ultrasonic communication device into audio data in a frequency range of 20 Hz-20 kHz, and subsequently presented to a user of the receiving ultrasonic communication device.

The above and other needs are met by computer-implemented methods and a system in an ultrasonic communication device.

DESCRIPTION OF THE DRAWINGS

FIG. 6A illustrates a flowchart for establishing local connectivity with another ultrasonic communication device, in accordance with one or more embodiments.

FIG. 6B illustrates a flowchart for establishing local connectivity with another ultrasonic communication device, in accordance with one or more embodiments.

DETAILED DESCRIPTION

An ultrasonic communication system facilitates transmission and reception of customized and localized ultrasonic data without the use of an intervening network communication system such as local area or wide area network systems. The ultrasonic communication between an ultrasonic communication transmitting device and an ultrasonic communication receiving device leverages the physical characteristics of ultrasonic data within a localized region, and does not require communication link technologies (e.g., Ethernet, 802.11, worldwide interoperability for microwave access (WiMAX), 3G, 4G, 5G, code division multiple access (CDMA) digital subscriber line (DSL), etc.) that provide uplink or downlink resources for either receiving or transmitting the ultrasonic signal data between devices. The system may be part of a headset (e.g., near-eye display or a head-mounted display).

The communication system includes an audio data transducer, an ultrasonic data transducer, an encoder-decoder assembly, as well as processing capabilities.

The ultrasonic communication system described herein provides a system of localized auditory display using ultrasonic encoding to transmit information acoustically between users wearing ultrasonic communication devices such as the above mentioned headsets without audio transmission to nearby individuals. Unlike radio frequency transmission or other typical wireless transmission systems, the use of ultrasound restricts the localized auditory display to transmit information to receiving devices that are within the local transmission range of the transmitting device.

Figure 1:
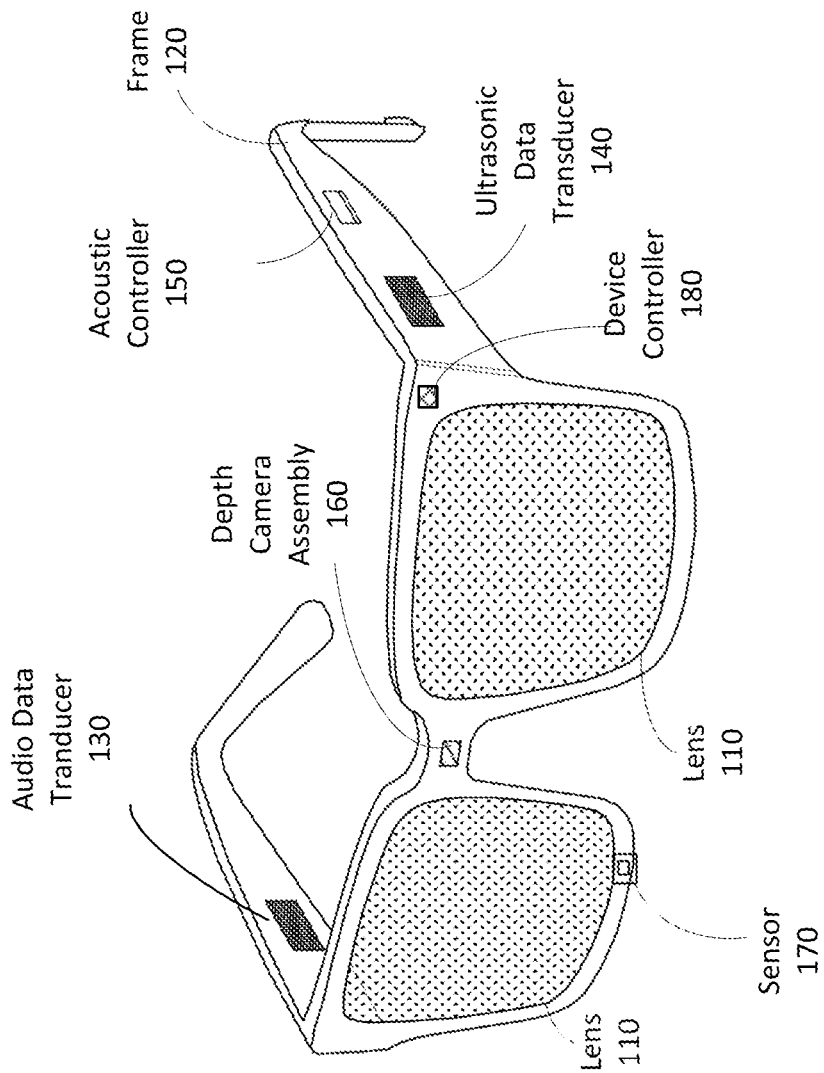
FIG. 1 is a diagram of an ultrasonic communication device, in accordance with one or more embodiments.

FIG. 1 is an illustration of an example of an ultrasonic communication device 100, according to one or more embodiments. In FIG. 1, the ultrasonic communication device 100 is shown as a wearable headset. In some embodiments, the ultrasonic communication device 100 may also be a stand-alone device, operating in a stationary or mobile mode. The ultrasonic communication device 100 may operate in a client mode or a broadcast mode.

The ultrasonic communication device 100 presents media to a user. In one embodiment, the ultrasonic communication device 100 may be a near-eye display (NED). In another embodiment, the ultrasonic communication device 100 may be a head-mounted display (HMD). In general, the device may be worn on the face of a user such that content (e.g., media content) is presented using one or both lens 110 of the device. However, the ultrasonic communication device 100 may also be used such that media content is presented to a user in a different manner. Examples of media content presented by the ultrasonic communication device 100 include one or more images, video, audio, or some combination thereof. The ultrasonic communication device 100 includes the ultrasonic communication system, and may include, among other components, a lens 110, a frame 120, an audio data transducer 130, an ultrasonic data transducer 140, an acoustic controller 150, an optional depth camera assembly 160, an optional sensor 170, and a device controller 180. While FIG. 1 illustrates the components of the ultrasonic communication device 100 in example locations on the ultrasonic communication device 100, the components may be located elsewhere on the ultrasonic communication device 100, on one or more peripheral devices that are paired with the ultrasonic communication device 100, or some combination thereof. In other embodiments, the device may comprise additional or fewer features than those described herein.

The ultrasonic communication device 100 may correct or enhance the vision of a user, protect the eye of a user, or provide images to a user. The ultrasonic communication device 100 may be eyeglasses which correct for defects in a user's eyesight. The ultrasonic communication device 100 may be sunglasses which protect a user's eye from the sun. The ultrasonic communication device 100 may be safety glasses which protect a user's eye from impact. The ultrasonic communication device 100 may be a night vision device or infrared goggles to enhance a user's vision at night. The ultrasonic communication device 100 may be a near-eye display that produces artificial reality content for the user. The device may include a lens 110 located within a frame 120. Alternatively, the ultrasonic communication device 100 may not include a lens 110 and may be only a frame 120 with an audio system that provides audio data to a user. The audio data may include audio content such as music, podcasts, radio, spoken content, and sound between 20 Hz-20 kHz.

The lens 110 provides or transmits light to a user wearing the ultrasonic communication device 100. The lens 110 may be prescription lens (e.g., single vision, bifocal and trifocal, or progressive) to help correct for defects in a user's eyesight. The prescription lens transmits ambient light to the user wearing the ultrasonic communication device 100. The transmitted ambient light may be altered by the prescription lens to correct for defects in the user's eyesight. The lens 110 may be a polarized lens or a tinted lens to protect the user's eyes from the sun. The lens 110 may be one or more waveguides as part of a waveguide display in which image light is coupled through an end or edge of the waveguide to the eye of the user. The lens 110 may include an electronic display for providing image light and may also include an optics block for magnifying image light from the electronic display.

The ultrasonic communication system facilitates customized and localized communication using audio-ultrasonic data encoding and decoding. The ultrasonic communication system includes an audio data transducer 130, and an ultrasonic data transducer 140, and an acoustic controller 150. However, in other embodiments, the system may include different and/or additional components. Similarly, in some cases, functionality described with reference to the components of the system can be distributed among the components in a different manner than is described here.

The audio data transducer 130 facilitates the transmission and reception of audio data within a local area. A local area is defined as an area that is proximal to a transmitting ultrasonic communication device, and is an area that is within the transmission range of the transmitting ultrasonic communication device. The audio data transducer 130 includes one or more audio microphones and one or more audio speakers.

The one or more microphones in the audio data transducer 130 capture acoustic data that is in a frequency range of between 20 Hz and 20 kHz received within a local area of the ultrasonic communication device 100. A local area is an environment surrounding the ultrasonic communication device 100. For example, the local area may be a room that a user wearing the ultrasonic communication device 100 is inside, or the user wearing the ultrasonic communication device 100 may be outside, and the local area is an outside area in which the microphone is able to detect sounds. In some embodiments, the one or more microphones are part of a microphone array. The local area may also be a region close to the user (e.g., their mouth)—and the microphone array may be configured to beam form towards the local area to increase detection of sounds spoken by a user of the ultrasonic communication device 100.

The one or more audio microphones may be located in one or more acoustic detection locations, including either an acoustic sensor or a port that may be positioned in different areas on the ultrasonic communication device 100. While FIG. 1 shows an exemplary location of the audio data transducer 130 on the frame 120 along a temple arm of the device 130, acoustic sensors and ports may be located anywhere on the ultrasonic communication device 100. A port may be an aperture in the frame 120 of the ultrasonic communication device 100. In the case of an acoustic detection location, the port may provide an in-coupling point for sound from a local area to an acoustic waveguide that guides the sounds to an acoustic sensor. An acoustic sensor captures sounds emitted from one or more sound sources in the local area (e.g., a room). The acoustic sensor is configured to detect sound and convert the detected sound into an electronic format (analog or digital). The acoustic sensors may be acoustic wave sensors, microphones, sound transducers, or similar sensors that are suitable for detecting sounds. The acoustic sensors may be embedded into the ultrasonic communication device 100, may be placed on the exterior of the device, may be separate from the ultrasonic communication device 100 (e.g., part of some other device), or some combination thereof. In some embodiments, an acoustic sensor may also be placed in an ear canal of each ear. The configuration of the acoustic detection locations, the number of acoustic detection locations, as well as the locations of the acoustic detection locations may vary within different embodiments. For example, the number of acoustic detection locations may be increased to increase the amount of audio information collected and the sensitivity and/or accuracy of the information. The acoustic detection locations may be oriented such that the one or more microphones is able to detect sounds in a wide range of directions surrounding the user wearing the ultrasonic communication device 100. Each detected sound may be associated with a frequency, an amplitude, a duration, or some combination thereof.

The one or more audio speakers in the audio data transducer 130 present audio data to the user of the ultrasonic communication device 100. The presented data may be based in part on sound field reproduction filters within the speakers. In some embodiments, the one or more speakers may be an array of speakers. The speakers comprise one or more acoustic emission locations that may be positioned on the ultrasonic communication device 100. While FIG. 1 shows an exemplary location of the audio data transducer 130 on the frame 120 along a temple arm of the device, the acoustic emission locations may be positioned anywhere on the ultrasonic communication device 100. In an embodiment, the acoustic emission location may be a location of a speaker or a port in the frame 120 of the ultrasonic communication device 100. In the case of an acoustic emission location, the port provides an out-coupling point of sound from an acoustic waveguide that separates a speaker of the loudspeaker array from the port. Sound emitted from the speaker travels through the acoustic waveguide and is then emitted by the port into the local area.

In some embodiments, the one or more speakers may include speakers that cover the ears of the user (e.g., headphones or earbuds). In other embodiments, the acoustic emission areas may be located on an exterior surface (i.e., a surface that does not face the user) of the frame 120. In alternate embodiments, some or all of the speakers may be placed on an interior surface (a surface that faces the user) of the frame 120. Increasing the number of acoustic emission areas may improve an accuracy and/or resolution of a sound field associated with the audio data.

In some embodiments, each acoustic detection location may be substantially collocated with a corresponding acoustic emission location. Substantially collocated refers to each acoustic detection location being less than a quarter wavelength away from the corresponding acoustic emission location. The number and/or locations of acoustic detection locations and corresponding acoustic emission locations may vary in various embodiments in order to control accuracy over a generated sound field.

The ultrasonic data transducer 140 facilitates the transmission and reception of ultrasonic data within a local area. The ultrasonic data transducer 140 includes an ultrasonic receiver array and an ultrasonic transmitter array.

The ultrasonic receiver array in the ultrasonic data transducer 140 has sufficient frequency response and sensitivity to receive ultrasonic data in a frequency that is greater than 20 kHz that is detected within the local area of the ultrasonic communication device 100. In some embodiments, the ultrasonic receiver array has direction of arrival (DOA) estimation capabilities enabling detection of the spatial and directional location of the ultrasonic transmission source.

The ultrasonic receiver array may be located in one or more ultrasonic detection locations, including either an ultrasonic sensor or a port that may be positioned in different areas on the ultrasonic communication device 100. While FIG. 1 shows an exemplary location of the ultrasonic data transducer 140 along a temple arm of the device, ultrasonic sensors and ports may be located anywhere on the ultrasonic communication device 100. A port may be an aperture in the frame 120 of the ultrasonic communication device 100. In the case of an ultrasonic detection location, the port may provide an in-coupling point for ultrasonic data from a local area to an ultrasonic waveguide that guides the ultrasonic data to an ultrasonic sensor. An ultrasonic sensor captures ultrasonic signals emitted from one or more ultrasonic sources in the local area (e.g., a room). The ultrasonic sensor is configured to detect ultrasonic signals and convert the detected ultrasonic signals into an electronic format (analog or digital). The ultrasonic sensors may be ultrasonic wave sensors, receiver arrays, or similar sensors that are suitable for detecting ultrasonic signals. The ultrasonic sensors may be embedded into the ultrasonic communication device 100, may be placed on the exterior of the device, may be separate from the ultrasonic communication device 100 (e.g., part of some other device), or some combination thereof. The configuration of the ultrasonic detection locations of the receiver array, the number of ultrasonic detection locations as well as the locations of the ultrasonic detection locations may vary within different embodiments. For example, the number of ultrasonic detection locations may be increased to increase the amount of ultrasonic information collected and the sensitivity and/or accuracy of the information. The ultrasonic detection locations may be oriented such that the one or more receivers is able to detect ultrasonic signals in a wide range of directions surrounding the user wearing the ultrasonic communication device 100. Each detected ultrasonic signal may be associated with a frequency, an amplitude, a duration, or some combination thereof.

The ultrasonic transmitter array in the ultrasonic data transducer 140 presents ultrasonic data based in part on acoustic wave reproduction filters. The ultrasonic transmitter array comprises one or more emission locations that may be positioned on the ultrasonic communication device 100. While FIG. 1 shows an exemplary location of the ultrasonic data transducer 140 along a temple arm of the device, the ultrasonic emission locations may be positioned anywhere on the ultrasonic communication device 100. In an embodiment, the ultrasonic emission location may be a location of a transmitter array or a port in the frame 120 of the ultrasonic communication device 100. In the case of an ultrasonic emission location, the port provides an out-coupling point of ultrasonic signals from an acoustic waveguide that separates a transmitter of the transmitter array from the port. Ultrasonic signals emitted from the transmitter travels through the acoustic waveguide and is then emitted by the port into the local area.

In some embodiments, the ultrasonic emission areas may be located on an exterior surface (i.e., a surface that does not face the user) of the frame 120. In some embodiments, some or all of the transmitters may be placed on an interior surface (a surface that faces the user) of the frame 120. Increasing the number of ultrasonic emission areas may improve an accuracy and/or resolution of an ultrasonic field associated with the ultrasonic data. In some embodiments, the transmitter array is a directional antenna array that employs beamforming to transmit the ultrasonic data towards a desired direction within the field of transmission, forming a cone of transmission designed to restrict transmission in undesired directions. Such beamforming increases the privacy of the communication between two ultrasonic devices.

In some embodiments, each ultrasonic detection location may be substantially collocated with a corresponding ultrasonic emission location. Substantially collocated refers to each ultrasonic detection location being less than a quarter wavelength away from the corresponding ultrasonic emission location. The number and/or locations of ultrasonic detection locations and corresponding ultrasonic emission locations may vary in various embodiments in order to control accuracy over a generated ultrasonic field.

The acoustic controller 150 facilitates the encoding of audio data into ultrasonic data, and a decoding of the ultrasonic data back into audio data. The acoustic controller 150 has an encoder-decoder assembly that encodes audio data in the frequency range of 20 Hz to 20 kHz into ultrasonic data with frequencies greater than 20 kHz in a lossless or semi-lossless manner. The acoustic controller 150 also includes onboard computation and processing capabilities with sufficient frequency resolution and sensitivity to receive ultrasonic data in frequencies that are greater than 20 kHz, and decode the received ultrasonic data into audio data in a frequency range of 20 Hz to 20 kHz. Further details regarding the encoder-decoder assembly may be found with respect to the ultrasonic communication system described with respect to FIG. 2.

The depth camera assembly (DCA) 160 determines depth information for one or more objects in the local area. The depth information may be used to, e.g., track objects in a local area surrounding the ultrasonic communication device 100. In some embodiments, the DCA 160 may include a light projector (e.g., structured light and/or flash illumination), a camera assembly, a DCA controller, etc. The light projector illuminates the local area (e.g., with structured light), and the camera assembly captures images of the illumined area of the local area. In one embodiment, the DCA 160 may include two or more cameras that are oriented to capture portions of the local area in stereo. The captured data may be images captured by the two or more cameras of the local area in stereo. The DCA controller may compute depth information of the local area using the captured image data and depth determination techniques (e.g., structured light, time-of-flight, stereo imaging, etc.). Based on the depth information, the DCA controller may determine absolute positional information of the ultrasonic communication device 100 within the local area. The DCA 160 may be integrated with the ultrasonic communication device 100 or may be positioned within the local area external to the ultrasonic communication device 100. In the latter embodiment, the DCA controller may transmit the depth information to the device controller 180 of the ultrasonic communication device 100.

Sensor 170 determines motion information with respect to the ultrasonic communication device 100. The sensor 170 may be located on a portion of the frame 120 of the ultrasonic communication device 100, as shown in FIG. 1. The sensor 170 generates one or more measurements signals in response to any motion of the ultrasonic communication device 100, and sends the generated signal to the device controller 180. The sensor 170 may include a position sensor, an inertial measurement unit (IMU), or both. Some embodiments of the ultrasonic communication device 100 may not include the sensor 170 or may include more than one sensor device 170. In some embodiments, the sensor 170 includes an inertial measurement unit (IMU) that generates IMU data based on measurement signals from the sensor 170. Examples of sensor devices 170 include: one or more accelerometers, one or more gyroscopes, one or more magnetometers, another suitable type of sensor that detects motion, a type of sensor used for error correction of the IMU, or some combination thereof. The sensor 170 may be located external to the IMU, internal to the IMU, or be some combination thereof. The sensor 170 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the ultrasonic communication device 100 from the sampled data. For example, the IMU integrates the measurement signals received from the accelerometers over time to estimate a velocity vector and integrates the velocity vector over time to determine an estimated position of a reference point on the ultrasonic communication device 100.

The device controller 180 generates positional information about the ultrasonic communication device 100. The positional information may be based on a predefined absolute coordinate system, or may be relative to a previous position of the ultrasonic communication device 100. A reference point may be used to describe the position of the ultrasonic communication device 100. While the reference point may generally be defined as a point in space, however, in practice the reference point is defined as a point within the ultrasonic communication device 100. The positional information may be a location of the ultrasonic communication device 100 and/or an orientation of the ultrasonic communication device 100 or the user's head wearing the ultrasonic communication device 100, or some combination thereof. The orientation may correspond to a position of each ear relative to a reference point. In some embodiments, the current position of the ultrasonic communication device 100 may be estimated by the sensor 170 and this estimated information may be sent to the device controller 180. In some embodiments, the device controller 180 uses the depth information and/or the absolute positional information from the DCA 160 along with the sensor data to perform object tracking within a local area of the ultrasonic communication device 100

Figure 2:
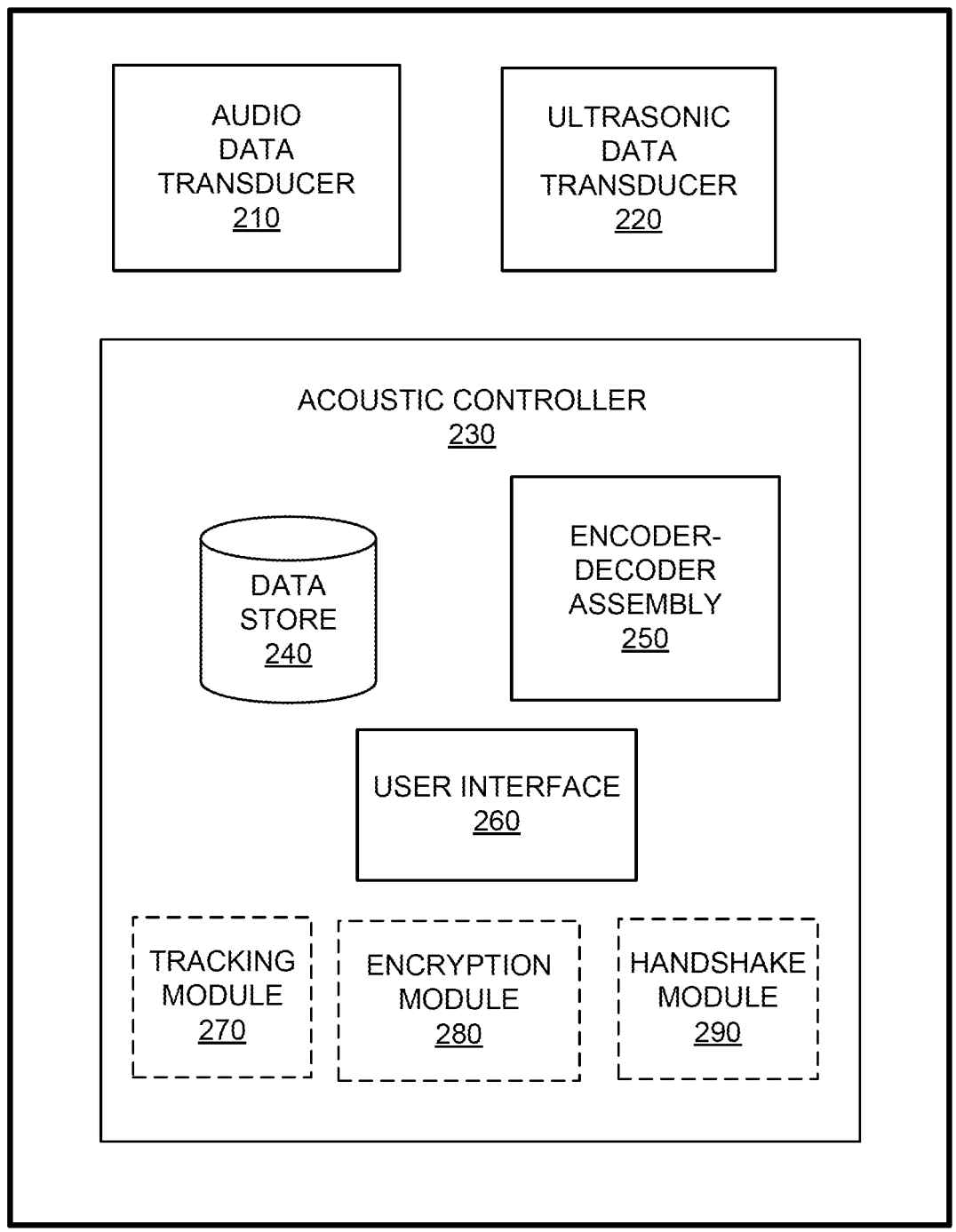
FIG. 2 illustrates a system for ultrasonic communication, in accordance with one or more embodiments.
Figure 3:
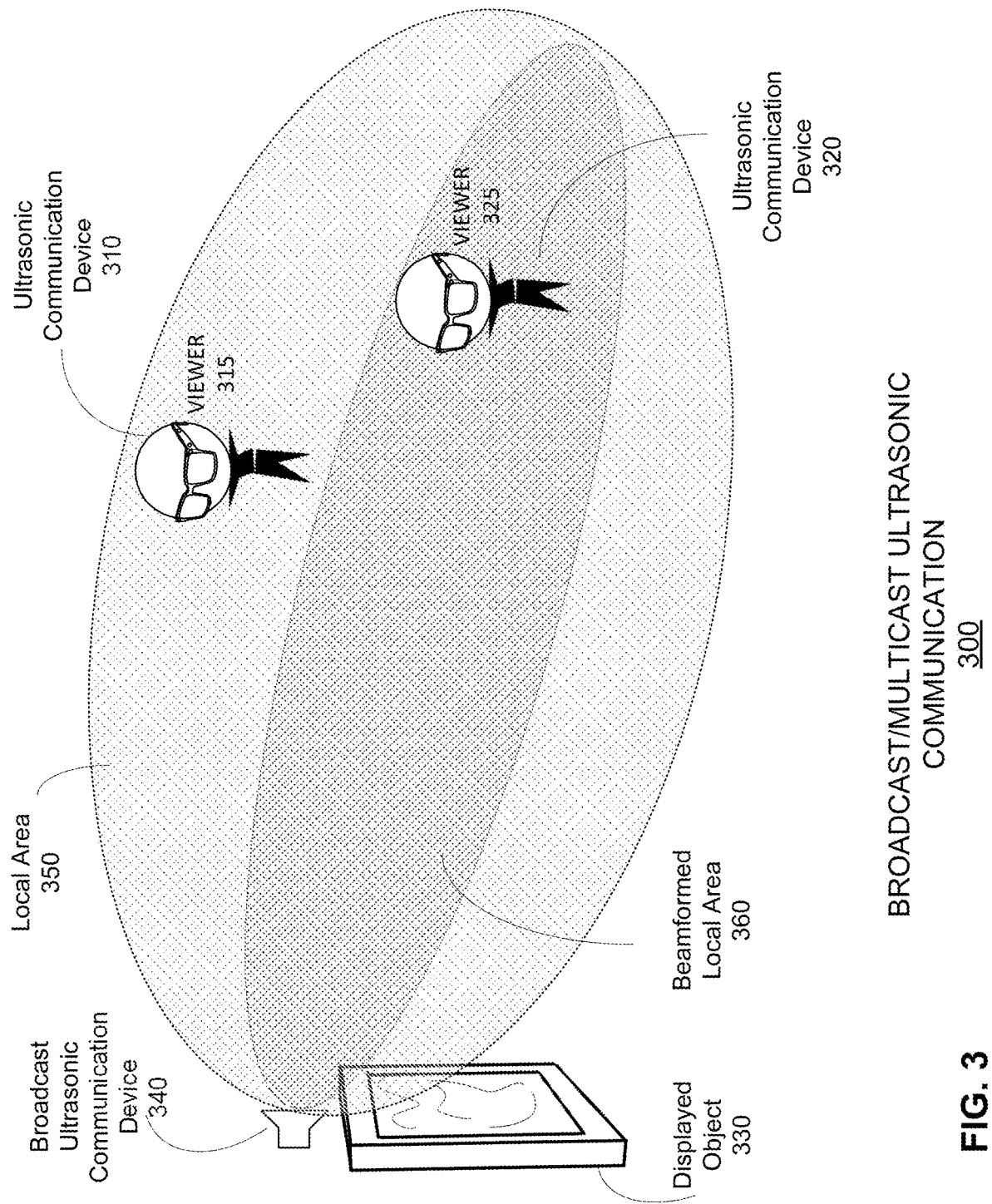
FIG. 3 depicts a broad/multi-cast use of the ultrasonic communication system, in accordance with one or more embodiments.
Figure 4:
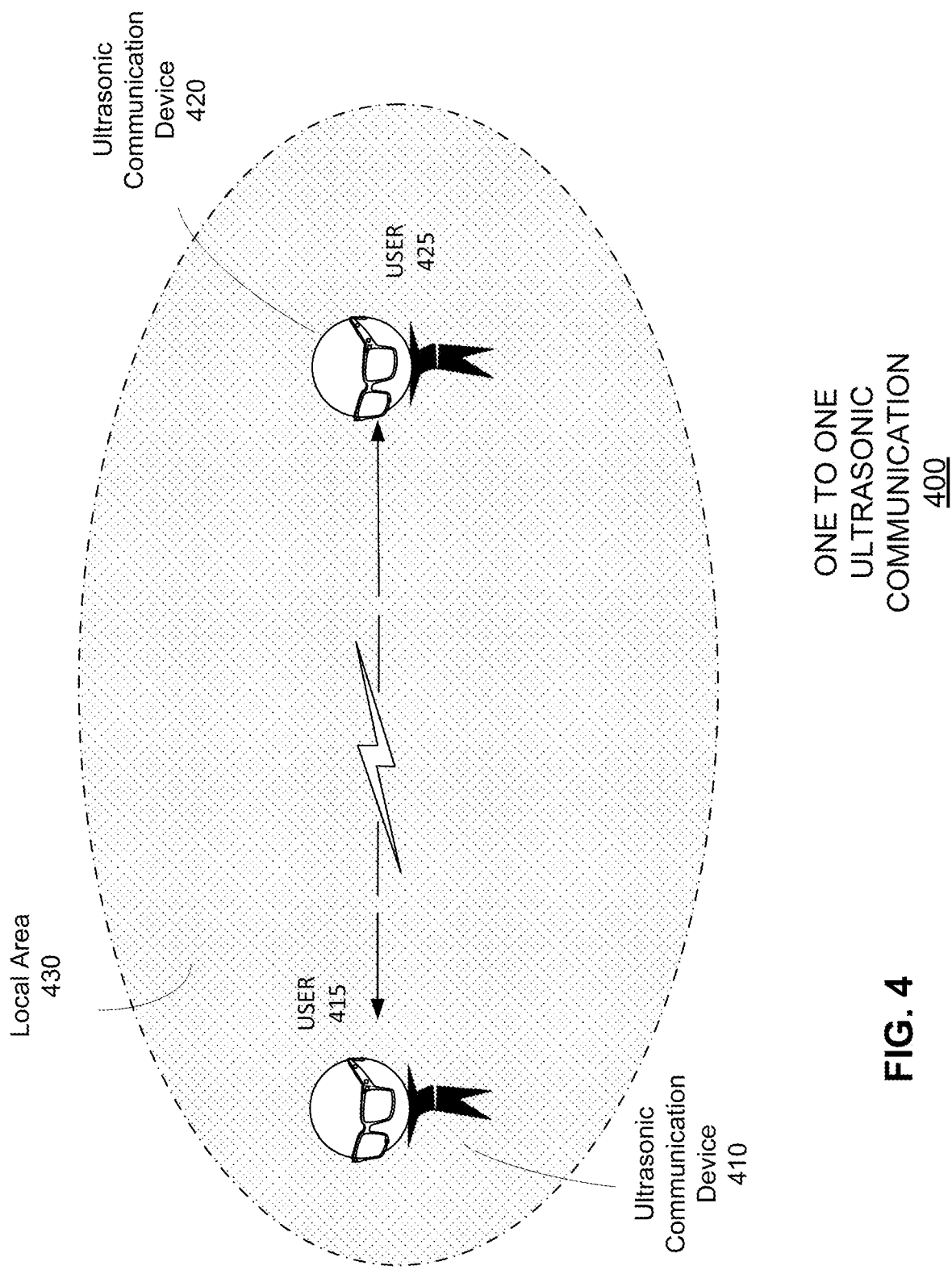
FIG. 4 depicts a one-to-one use of the ultrasonic communication system, in accordance with one or more embodiments.

FIG. 2 is a block diagram of an ultrasonic communication system 200, in accordance with one or more embodiments. The ultrasonic communication system 200 comprises an audio data transducer 210, an ultrasonic data transducer 220, and an acoustic controller 230. The ultrasonic communication system 200 may reside on a wearable headset device such as shown and described with respect to FIG. 1. The ultrasonic communication systems described in the context of FIGS. 3, 4, and 5 are embodiments of the ultrasonic communication system 200. In various embodiments, the ultrasonic communication system 200 may include different or additional components than those described in conjunction with FIG. 2. Additionally, functionality provided by different components described below in conjunction with FIG. 2 may be differently allocated among various components of the system 200 in some embodiments. Exemplary applications of the ultrasonic communication system 200 are also discussed below with regard to FIGS. 4 and 5.

The ultrasonic communication system 200 facilitates communication between users of ultrasonic communication devices such as the ultrasonic communication device 100 (described in conjunction with FIG. 1). It may be used to facilitate transmission and reception of customized and localized acoustic data without the use of a network system for either receiving or transmitting acoustic data.

The audio data transducer 210 in the ultrasonic communication system 200 facilitates the transmission and reception of audio data within a local area. While an example of the audio data transducer 210 is shown in FIG. 1 as audio data transducer 130 located on the ultrasonic communication device 100, the audio data transducer 210 may be embedded into the ultrasonic communication device 100, may be placed on the exterior of the device, may be separate from the ultrasonic communication device 100 (e.g., part of some other device), or some combination thereof. The audio data transducer 210 may include one or more audio speakers as well as one or more audio sensors.

The audio data transducer is configured to receive, using one or more audio sensors such as microphones, physical sound waves in frequencies between 20 Hz to 20 kHz, convert the physical sound waves into analog electrical signals, and convert the analog electrical signal to digital audio data for further processing using an analog to digital converter (ADC). The audio data transducer is also configured to receive a digital audio stream, convert the digital audio stream into analog electrical signals using a digital to analog converter (DAC), convert, using one or more audio speakers, the analog electrical signals into physical sound waves in frequencies between 20 Hz to 20 kHz, and transmit the physical sound waves.

The one or more audio speakers in the audio transducer 210 are configured to present the physical sound waves in the frequency range of 20 Hz-20 kHz.

In some embodiments, the one or more audio speakers in the audio transducer 210 may be an array of speakers. The audio speakers may be structured with driver units using several different technologies including dynamic driver units, balanced armature drivers, planar magnetic drivers, electrostatic drivers, piezoelectric drivers, magnetostrictive drivers, hybrids, and other combinations thereof. The one or more speakers present the audio data to the user in accordance with instructions from the acoustic controller 230.

The one or more audio sensors in the audio transducer 210 are configured to capture audio data in the frequency range of 20 Hz-20 kHz. These acoustic sensors may include, e.g., acoustic wave sensors, microphones, sound transducers, or similar sensors that are suitable for detecting sounds. In some embodiments, the audio sensors in the audio data transducer 210 may be a microphone array. The sensors may be structured with dynamic microphones that use a coil suspended in a magnetic field, condenser microphones that use a vibrating diaphragm as a capacitor plate, piezoelectric microphones, fiber optic microphones, laser microphones, among others. The configuration of the acoustic detection locations of a microphone array, the number of acoustic detection locations as well as the locations of the acoustic detection locations may vary within different embodiments. For example, the number of acoustic detection locations may be increased to increase the amount of audio information collected and the sensitivity and/or accuracy of the information. The acoustic detection locations may be oriented such that the one or more microphones is able to detect sounds in a wide range of directions surrounding the user.

The ultrasonic data transducer 220 in the ultrasonic communication system 200 facilitates the transmission and reception of ultrasonic data within a local area. While an example of the ultrasonic data transducer 220 is shown in FIG. 1 as ultrasonic data transducer 140 located on the ultrasonic communication device 100, the ultrasonic transducer 220 may be embedded into the ultrasonic communication device 100, may be placed on the exterior of the device, may be separate from the ultrasonic communication device 100 (e.g., part of some other device), or some combination thereof. The ultrasonic data transducer 220 may include one or more ultrasonic transmitters as well as one or more ultrasonic microphones.

The ultrasonic data transducer is configured to receive, using one or more ultrasonic microphones, physical ultrasonic waves in frequencies that are greater than 20 kHz, convert the physical ultrasonic waves into analog electrical signals, and convert the analog electrical signal to a digital ultrasonic stream for further processing using an analog to digital converter (ADC). The ultrasonic data transducer is also configured to receive a digital ultrasonic stream, convert the digital ultrasonic stream into analog electrical signals using a digital to analog converter (DAC), convert the analog electrical signals into physical ultrasonic waves in frequencies that are greater than 20 kHz, and transmit the physical sound waves.

The one or more ultrasonic transmitters in the ultrasonic data transducer 220 transmits ultrasonic frequency data in frequencies greater than 20 kHz. In some embodiments, the transmitters form a transmitter array. The transmitter array reproduces ultrasonic frequencies with sufficient energy and directivity to transmit the ultrasonic data to ultrasonic communication devices located within a transmission range of the ultrasonic communication system 200. The ultrasonic transmitter array may be structured using piezoelectric, capacitive, and magnetostrictive technologies, among others.

In some embodiments, the ultrasonic transmitter array may transmit an initial ultrasonic information beacon with transmission parameters such as communication channel information, encryption keys, transmission protocol information, encoding protocol information, etc., prior to commencing transmission of the ultrasonic data.

In some embodiments, the ultrasonic transmitter array employs beamforming to transmit the ultrasonic data towards a desired direction spatial range within the transmission range. The beam pattern of an ultrasonic array transmitter may be defined by the transmitter array shape, area, transmission wavelength, etc. Employing beamforming or spatial filtering facilitates directional transmission in contrast to omnidirectional transmission. The ultrasonic transmitter array may control the phase and relative amplitude of the signal at each transmitter of the transmitter array, thereby creating a pattern of constructive and destructive interference to enforce directional transmission. Some embodiments may use fixed beamforming while other embodiments may employ adaptive beamforming to filter out unwanted signals in other directions. In one embodiment, the communication system 200 may receive indicator signals, and the ultrasonic data transducer may use beamforming to direct transmissions towards an intended receiving ultrasonic communication device, using DOA capabilities of a directional receiver array in the ultrasonic data transducer 220 to achieve spatial selectivity.

The one or more ultrasonic microphones in the ultrasonic data transducer 220 capture ultrasonic data in frequencies greater than 20 kHz. In some embodiments, the microphones in the ultrasonic transducer 220 may be a microphone array, with two or more spatially separated ultrasonic sensors. The ultrasonic microphones may be structured using various technologies, for example piezoelectric microphones, capacitive microphones, micro-machined ultrasonic transducers (MUTs) using micro-machining MEMS technology, among others.

The ultrasonic microphones have sufficient frequency response and sensitivity to receive ultrasonic data at a frequency that is greater than 20 kHz and that is detected within a local area. In accordance with the Nyquist-Shannon sampling theorem, the analog signal is sampled at a frequency of at least two times the desired highest frequency present in the analog signal for lossless conversion into the digital domain. Thus, in embodiments described herein, in order to achieve nearly lossless encoding, the received ultrasonic data (with a frequency that is greater than 20 kHz) is sampled at a sampling frequency of at 40 kHz, and may be sampled at a frequency that is greater than 48 kHz for higher accuracy.

In some embodiments, the ultrasonic microphone array is structured to receive beamformed ultrasonic data. The shape, area, individually weighted sensor amplification, etc., of the ultrasonic microphone array may be structured in order to enable a desired directional receiving pattern. In one embodiment, the ultrasonic microphone array may receive instructions from the acoustic controller 230 to determine the direction of reception of beamformed ultrasound data. In some embodiments, the ultrasonic microphone array may have DOA estimation capabilities for detecting the spatial and direction location of an ultrasonic transmitting source.

As described above, the audio data transducer 210 may include audio transmitters such as audio speakers and audio receivers, such as audio sensors. Similarly the ultrasonic data transducer 220 may include ultrasonic transmitters as well as ultrasonic microphones. However, this description is not meant to be limiting. In various embodiments, the audio transmitters, audio receivers, ultrasonic transmitters, and ultrasonic receivers may be distributed among multiple, varying modules. Thus, for example, in one embodiment, there may be separate modules for each of the audio transmitters, the audio receivers, the ultrasonic transmitters, and the ultrasonic receivers. In another embodiment, a transmitter module may include both the audio transmitters and the ultrasonic transmitters, while a receiver module may include audio receivers and ultrasonic receivers. There may also be an embodiment where the audio transmitters, audio receivers, ultrasonic transmitters and ultrasonic receivers may all be included in a single module.

The acoustic controller 230 in the ultrasonic communication system 200 controls the components of the ultrasonic communication system 200. The acoustic controller 230 includes a data store 240, an encoder-decoder assembly 250, a user interface 260, and optionally, a tracking module 270, an encryption module 280, and a handshake module 290. In some embodiment, the controller may receive activation commands from the user through a user interface 260. Upon activation, the controller 230 may activate the audio data transducer 210 and the ultrasonic data transducer 220 for reception and transmission of acoustic data. In other embodiments, the acoustic controller 230 comprises additional or fewer modules than those described herein. Similarly, the functions can be distributed among the modules and/or different entities in a different manner than is described here.

The data store 240 is a memory that stores information for the ultrasonic communication system 200. The stored information may include display instructions for the user interface, transmission and receiving parameters for the audio data transducer 210 and the ultrasonic data transducer 220, imaging parameters for the camera depth assembly 160, a virtual model of a target area around the ultrasonic communication device 100, local image and positional data from the camera depth assembly 160, tracking data, speech data, audio data, ultrasonic data, encryption keys, ultrasonic beacon information such as communication channel information, encryption keys, transmission protocol information, encoding protocol information, local network settings such as security tokens, etc. The data store 250 may store predefined mappings between settings received through the user interface and associated functionalities to be further performed by the ultrasonic communication system 200. The data store 240 is a memory, such as a read only memory (ROM), dynamic random access memory (DRAM), static random access memory (SRAM), or some combination thereof.

The data store 240 may receive the audio data for storage from the audio data transducer 210. The data store 240 may receive the ultrasonic data for storage from the ultrasonic data transducer 230. In some embodiments, the data store 240 may receive acoustic data for storage, both audio as well as ultrasonic, from a networked data source (not depicted). In some embodiments, the data store 240 receives audio data as well as ultrasonic data from the encoder-decoder assembly 250 for storage. The data store 240 may receive instructions from the acoustic controller 230 to send selected stored audio data to the audio data transducer 210 for transmission and/or to the encoder-decoder assembly 250 for encoding into ultrasonic data. The data store 250 may receive instructions from the acoustic controller 230 to send selected stored ultrasonic data to the ultrasonic data transducer 220 for transmission and/or to the encoder-decoder assembly 250 for decoding into audio data. The data store 250 may receive instructions from the acoustic controller 230 to send selected stored encryption keys to the encryption module. The data store 250 may receive instructions from the acoustic controller 230 to send selected stored tracking data, stored virtual models of a target area around the ultrasonic communication device 100, and stored image and positional data to the tracking module. The data store 250 may receive instructions from the acoustic controller 230 to use stored mappings and select functionalities associated with received setting values from a user through the user interface 260. The selected functionalities may be sent by the data store to the acoustic controller 230 to be further executed by the modules of the ultrasonic communication system 200.

The encoder-decoder assembly 250 transforms audio data into ultrasonic data so that the audio data may subsequently be recovered in a lossless or semi-lossless manner. The encoder-decoder assembly 250 includes onboard computation and signal processing capabilities with sufficient frequency resolution and sensitivity to encode audio data in a frequency range of 20 Hz-20 kHz into ultrasonic data in frequencies greater than 20 kHz, and decode the ultrasonic data in frequencies greater than 20 kHz into audio data in a frequency range of 20 Hz-20 kHz.

The encoder-decoder assembly 250 receives digital audio data that is in a frequency range of 20 Hz to 20 kHz from the audio data transducer 210, modulates the digital audio data using a digital ultrasonic carrier signal in a frequency that is greater than 20 kHz to generate digital ultrasonic data. This digital ultrasonic data is sent to the ultrasonic data transducer 220 for conversion and transmission as a physical ultrasonic wave. Similarly, the encoder-decoder assembly 250 receives digital ultrasonic data that is in a frequency greater than 20 kHz from the ultrasonic data transducer 210, demodulates the digital ultrasonic data to separate the digital audio data in a frequency range between 20 Hz and 20 kHz to generate digital audio data. This digital audio data is sent to the audio data transducer 220 for conversion and transmission as a physical audio wave through speakers.

In some embodiments, the encoder-decoder assembly 250 may employ an ultrasonic carrier signal and use amplitude modulation, frequency modulation, or phase modulation to encode the audio data into ultrasonic data. In some embodiments, the encoder-decoder assembly 250 may perform frequency shifts to encode the audio data into ultrasonic data. The encoder-decoder assembly 250 has onboard computational and sign processing capabilities to perform corresponding demodulation frequency shift as needed while decoding the ultrasonic data into audio data.

The audio data may be received at the assembly 250 from the audio data transducer 210 for encoding, for example, audio speech data received in real time as spoken by a user of the ultrasonic communication device 100. In some embodiments, audio data may also be selected from the data store 240 by the acoustic controller 230 and sent to the encoder-decoder assembly 250 for encoding into ultrasonic data for transmission. In some embodiments, the encoder-decoder assembly 250 may receive instructions from the acoustic controller 230 to select stored audio data from the data store 240 for periodic encoding into ultrasonic data and sending it to the ultrasonic data transducer 220 for transmission according to a particular transmission schedule. In some embodiments, encoded ultrasonic data may be sent by the encoder-decoder assembly 250 to the data store 240 for storage based on instructions from the acoustic controller 230.

The encoder-decoder assembly 250 may receive ultrasonic data for decoding from the ultrasonic transducer assembly 220, for example, from ultrasonic communication received by the ultrasonic microphone array in the ultrasonic transducer assembly 220. In some embodiments, the ultrasonic data may also be received at the encoder-decoder assembly 250 from the data store 240 based on instructions from the acoustic controller 230. In one embodiment, the encoder-decoder assembly 250 may receive instructions from the acoustic controller 230 to select stored ultrasonic data from the data store 240 for periodic decoding into audio data and sending this data to the audio transducer assembly 210 for audio playback according to a particular playback schedule.

In some embodiments, the encoder-decoder assembly 250 facilitates multiple audio data to be encoded for simultaneous transmission by the ultrasonic data transducer 220. In these embodiments, the user of a receiving ultrasonic communication device may "opt-in" to a particular transmission stream. The encoder-decoder assembly 250 in the receiving device may decode the particular transmission stream selected by the user, thereby receiving audio data that is relevant to them based on their particular setting choices.

The user interface 260 facilitates interaction with a user of the ultrasonic communication system. The user interface 260 may be a virtual image display presented to the user displaying settings for selection by the user. In some embodiments, the user interface 260 may have physical controls, for example, physical buttons that may be pressed, physical dials that may be rotated, and touch enabled physical touch screens. In an embodiment, speech data may be received by the audio data transducer 210, and subsequently interpreted by the user interface module 260 as spoken commands. In one embodiment, a user gesture may identified by the tracking module 270, and subsequently interpreted by the user interface module 260 as a gestural command from the user. In some embodiments, settings to operate the ultrasonic communication system 200 may be information that is provided to a user through environmental signage (for example, "Set your headset to setting 2 for a special message at this location") or through standardized transmission protocols (for example, English messages are always encoded to an ultrasonic frequency of 35 kHz, Japanese messages are always encoded to an ultrasonic frequency of 25 kHz). In some embodiments, upon activation, the user interface 260 may display a selection of settings for reception of ultrasonic data. For example, when the user selects "English" as the language for receiving data, the acoustic controller 230 may ensure that the ultrasonic data transducer is tuned to receive the ultrasonic data at a frequency of 35 kHz following a pre-established transmission protocol. In some embodiments, the user interface 260 may prompt the user through a graphical interface to select settings. In one embodiment, the user interface 260 may prompt the user to provide voice commands that are received by the audio data transducer 210.

The tracking module 270 may optionally be present in some embodiments. In some embodiments, the tracking module may perform object tracking using depth information received from a depth camera assembly such as DCA 160 and/or sensor information obtained from a sensor such as sensor 170, both depicted in FIG. 1. The tracking module 270 may provide the tracking information to the acoustic controller 230 for use in controlling the directional microphone array and directional antenna array in the ultrasonic data transducer for beamforming applications.

Some embodiments of the ultrasonic communication system 200 may optionally include an encryption module 280. Encryption keys stored in the data store 240 may be provided to the encryption module for performing encryption and decryption of the ultrasonic data during encoding and decoding of the acoustic data by the encoder-decoder assembly 250.

Some embodiments of the ultrasonic communication system 200 may include a handshake module 290. The handshake module 290 facilitates the establishment of a local connection with another ultrasonic communication device in the local area. The handshake module 290 may retrieve network connection setup information, such as security tokens, etc. from the data store 250, and transmit this setup information as a handshake beacon indicating a connection offer using the ultrasonic data transducer 220. Upon receiving the handshake beacon, the receiving ultrasonic communication system in a receiving ultrasonic communication device may use the user interface module 260 in the receiving device to display one or more prompts to enable a user of the receiving ultrasonic communication device to accept or decline the connection offer. In response to receiving an accept of the connection offer from the user of the receiving device, the ultrasonic communication system 200 may direct network connection modules in the device (not shown) to transmit an acknowledgement and proceed with sharing data, VOIP, etc. using a locally established network connection based on the transmitted and received ultrasonic network setup information.

Embodiments of the ultrasonic communication system 200 described herein may operate in unicast mode or in broadcast mode. In a unicast mode, the ultrasonic communication may be one-to-one communication between two ultrasonic communication devices. In this embodiment, ensuring privacy during the communication may be of importance, and the ultrasonic transmissions between the two ultrasonic communication devices may employ beamforming to target the ultrasonic transmissions towards the receiving ultrasonic communication device. In a broadcast mode, the ultrasonic communication may be in a one-to-all format, between an ultrasonic communication device that is broadcasting ultrasonic transmissions, and all ultrasonic communication devices that are within transmission range for reception of the broadcast transmissions. In some embodiments, the broadcast transmission may be considered to be a multicast mode, where the transmission may be in a one-to-some format, where the broadcasting ultrasonic communication device may be transmitting ultrasonic data, the transmission intended for reception by a particular set of receiving devices within transmission range, not all receiving devices within transmission range. In the descriptions herein, the term "broadcast" is used to inclusive of both, one-to-all and one-to-some transmission formats.

FIG. 3 depicts a broadcast ultrasonic communication system 300, in accordance with one or more embodiments. The illustrated ultrasonic communication system 300 includes ultrasonic communication devices 310 and 320, ultrasonic communication device 310 with viewer 315 and ultrasonic communication device 320 with viewer 325, a displayed object 330, and a broadcast ultrasonic communication device 340.

The ultrasonic communication devices 310 and 320 are depicted as wearable headset embodiments of the ultrasonic communication device described with respect to FIG. 1, each device including embodiments of the ultrasonic communication system 200 as described with respect to FIG. 2. Devices 310 and 320 may operate in a client mode, receiving ultrasonic transmissions when they are located within a local area 350 of a transmitting device such as ultrasonic communication device 340. In some embodiments, the devices 310 and 320 may transmit indicator signals to indicate their presence to any neighboring receiver within transmission range. In an embodiment, depicted device 320 may also transmit an indicator signal that is received by a multicast/broadcast device such as device 340. In response, the device 320 may also receive beamformed transmission from the device 340, the transmission specifically spatially targeted towards the device 320. Alternately, device 320 may receive beamformed transmission from the device 340 as a result of being tracked by device 340. Such beamformed transmission is designed to be transmitted within a predefined range, and hence is received by device 320 when viewer 325 is within beamformed local area 360. The beamformed transmission may not be received by device 310 when the corresponding viewer 315 is within local area 350 of the ultrasonic communication device 340, but not within the beamformed local area 360 of the device 340.

In one embodiment, the device 320 may initially receive an ultrasonic information beacon with transmission parameters such as communication channel information, encryption keys, transmission protocol information, encoding protocol information, etc. In response to receiving the informational beacon, the device 320 may inform its viewer 325 user about settings, may automatically adjust settings in device 320 for reception of the ultrasonic data from device 340, and may query the viewer 325 about particular settings through a user interface in the device 320, such as the user interface 260 described with respect to FIG. 2. For example, the user may be given a selection of languages to hear the recorded message. In another example, the user may be given a selection of a detailed recording or a brief summarized recording about the displayed object 330. In one embodiment, the device 320 may receive a plurality of ultrasonic data that is transmitted from the device 340, and based on received settings from the viewer, may decode only a subset of the received plurality of ultrasonic data for playback as audio data to the viewer. For example, the received ultrasonic data may be involve encoding of the audio data in three different languages, say, English, Spanish, and French. Based on a desired language setting, of say, Spanish, the received ultrasonic data at device 320 may be selectively decoded to only present the Spanish audio data recording to the user 325.

FIG. 3 includes a displayed object 220. Examples of displayed objects may be any object that has some information associated with it, for example a piece of art, a museum artifact, a person, a descriptive poster, etc. Displayed object 330 may be located in a particular space for display to viewers. The ultrasonic communication device 340 may be used to communicate the information that is associated with the displayed object 330 information in broadcast or multicast mode about the displayed object 330 to the viewing public, such as viewer 315 and viewer 325, through client devices possessed by the viewers, such as respective devices 310 and 320 operating in client mode. The ultrasonic communication device 340 may be positioned as a stationary device near the displayed object 330 in such a manner that a viewer of the displayed object 330 may be within the ultrasonic transmission range of the broadcast/multicast device 340.

The ultrasonic communication device 340 is depicted as a broadcast embodiment of the ultrasonic communication device described with respect to FIG. 1, with an ultrasonic communication system 200 as described with respect to FIG. 2. The ultrasonic communication device 340 may store recorded audio data about the displayed object 330. Thus, in the museum example, audio information about the displayed objects may be recorded in several languages and stored in the device 340 for transmission to receiving devices such as device 310 and device 320. Signage near the displayed object 330 may instruct viewers to activate their devices for receiving information about the displayed object. Examples of the subsequent broadcast communication depicted in FIG. 3 are described below.

In one embodiment, the ultrasonic device 340 may transmit ultrasonic data about the displayed object 330 periodically as a broadcast for reception by any receiving device within the localized transmission range 350. In some embodiments, a tracking module in the device 340, such as tracking module 270 described with respect to communication system 200 in FIG. 2, may detect the presence of a viewer 315 and begin transmitting ultrasonic data about the displayed object 330 as a broadcast. In another embodiment, in response to indication from the tracking module 270 regarding tracked location of, for example, viewer 325, the device 340 may use its directional antenna array and transmit the ultrasonic data in a beamformed transmission range 360, so that device 320 may receive the transmitted ultrasonic data. In one embodiment, the device 340 may initially receive an indicator signal indicating the presence of a receiver, and subsequently begin broadcast transmission of the ultrasonic data in response to the receiver signal. In one embodiment, the broadcast transmission may be beamformed for reception by devices within the beamformed transmission range 360.

In one embodiment, the device 340 may initially broadcast an ultrasonic information beacon with transmission parameters such as communication channel information, encryption keys, transmission protocol information, encoding protocol information, etc. In one embodiment, the device 340 may receive chosen settings from the device 320 and in response, may encode selected stored audio data from its data store 240 into ultrasonic data and transmit the selectively encoded ultrasonic data either as a broadcast, or a multicast transmission based on the received settings. For example, in one embodiment, viewer 315 may select English as a desired language setting while user 325 may select Spanish as a desired language setting. The ultrasonic communication device 340 may employ beamforming to transmit customized English encoded ultrasonic data towards device 310 and transmit customized Spanish encoded ultrasonic data towards device 320.

FIG. 4 depicts one to one ultrasonic communication 400, in accordance with one or more embodiments. The illustrated ultrasonic communication involves ultrasonic communication device 410 with user 415 and ultrasonic communication device 420 with user 425 without the use of a networking system (for example, internet, cellular, wireless, etc. communication links) between the two devices 410 and 420.

The devices 410 and 420 are depicted as wearable headset embodiments of the ultrasonic communication device described with respect to FIG. 1, each device including embodiments of the ultrasonic communication system 200 as described with respect to FIG. 2. Ultrasonic communication devices 410 and 420 may transmit ultrasonic data within a local area 430, and receive ultrasonic transmission when they are located within the local area 430. The local area 430 may depict the transmission range of a transmitting ultrasonic communication device. While FIG. 4 depicts the same transmission range for both ultrasonic communication devices 410 and 420 (i.e., the depicted local area 430), this is for ease of illustration, and the two ultrasonic communication device 410 and 420 may have different local transmission ranges. The following description illustrates, without limitation, a use case scenario involving one-to-one communication between the two ultrasonic communication devices 410 and 420.

User 415 may wish to initiate private communication with user 425 who is located within a local area of user 415. In these embodiments, a local area is defined as a local ultrasonic transmission range of ultrasonic communication device 410 that is being used by user 415 for ultrasonic communication. In one embodiment, user 415 may first indicate to the intended receiver, user 425, to activate their ultrasonic communication device 420. This may be in the form of an initial notification beacon that may be broadcast or beamformed towards the intended receiver, or it may be in the form of a physical indication by user 415 to user 425. The initial notification beacon may include transmission parameters such as communication channel information, encryption keys, transmission protocol information, encoding protocol information, etc. In one embodiment, ultrasonic communication device 410 may transmit this information beacon independently as a beamformed transmission directed toward the ultrasonic communication device 420, the beamforming based on information received by the ultrasonic communication system in ultrasonic communication device 410 from the tracking module within the device. User 415 may then use ultrasonic communication device 410 to commence communication with user 425. Speech data by user 415 is received in real-time by the audio data transducer 210 in the ultrasonic communication system 200 of ultrasonic communication device 410. The received speech data is encoded into ultrasonic data in real-time by the encoder-decoder assembly 250 in the ultrasonic communication system 200 of ultrasonic communication device 410. The ultrasonic data transducer may transmit the encoded ultrasonic data in real-time. In some embodiments, the ultrasonic data may be encrypted prior to transmission to facilitate private communication. In some embodiments, the ultrasonic data may be beamformed towards the intended recipient, user 425 with ultrasonic communication device 420.

User 425 may initially receive an indication from user 415 regarding activating their device. In some embodiments, ultrasonic communication device 420 may always be in an activated state, and may receive an indicator "hello" beacon indicating the presence of an ultrasonic transmitting device in the local area, an area being limited to the transmission range of a transmitting device. In some embodiments, ultrasonic communication device 420 may receive one or more informational beacons including transmission parameters such as communication channel information, encryption keys, transmission protocol information, encoding protocol information, etc. In some embodiments, ultrasonic communication device 420 may commence communication with ultrasonic communication device 410 using the received parameters. In some embodiments, the ultrasonic communication device 420 employs beamforming transmission based on information from the device's tracking module 270 in the ultrasonic communication system 200 as described in FIG. 2. In other embodiments, the ultrasonic communication may be a localized ultrasonic transmission that may use encrypted data to ensure privacy. The ultrasonic data received at ultrasonic communication device 420 by the ultrasonic data transducer 220 in the ultrasonic communication device 420 is decoded in the encoder-decoder assembly 250 into audio data which is subsequently presented by the audio data transducer through the speakers in ultrasonic communication device 420 to the user 425. Speech data by user 425 is received in real-time by the audio data transducer 210 in the ultrasonic communication system 200 of ultrasonic communication device 420. The received speech data is encoded into ultrasonic data in real-time by the encoder-decoder assembly 250 in the ultrasonic communication system 200 of ultrasonic communication device 420. The ultrasonic data transducer transmits the encoded ultrasonic data in real-time.

In one embodiment, the localized ultrasonic communication may not be restricted to just two devices as depicted in FIG. 4, but may be conducted by multiple ultrasonic communication devices within a localized ultrasonic transmission range. Users with these devices may communicate with each other through localized ultrasonic transmission and reception using either shared communication parameters or a standardized protocol.

Figure 5B:
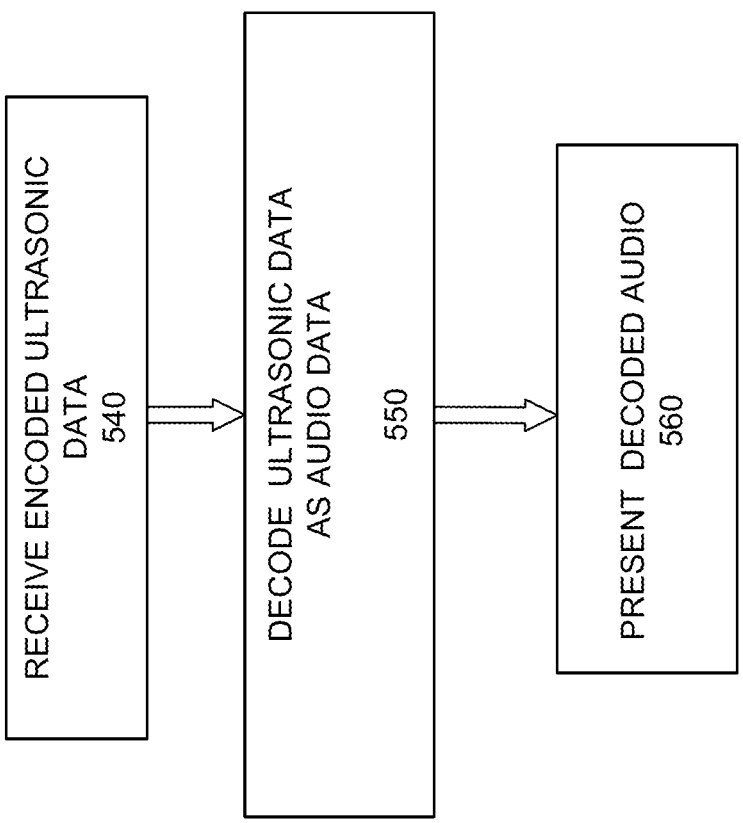
FIG. 5B illustrates a flowchart for performing ultrasonic communication, in accordance with one or more embodiments.
Figure 5A:
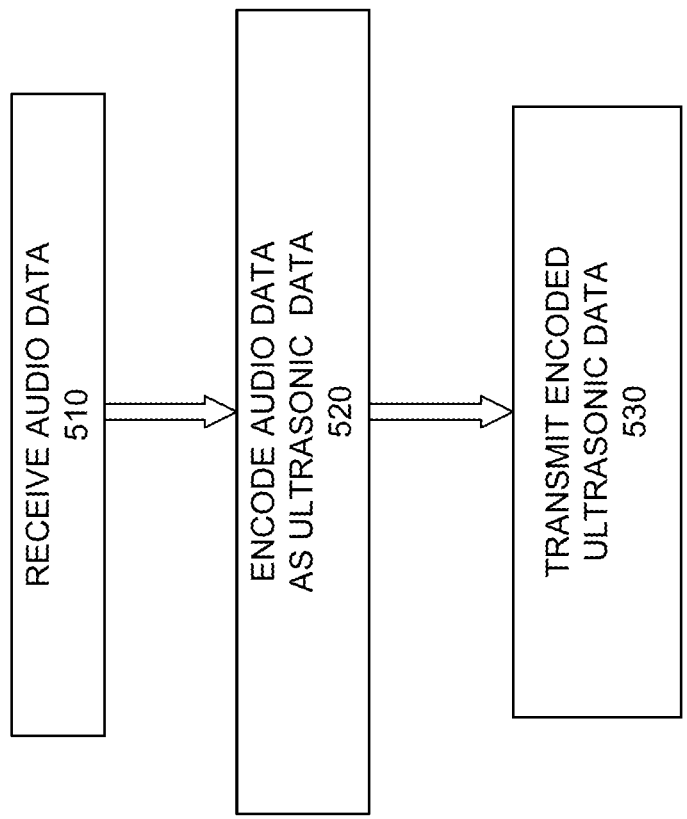
FIG. 5A illustrates a flowchart for performing ultrasonic communication, in accordance with one or more embodiments.

FIG. 5A is a flowchart of one embodiment of a method for transmitting encoded ultrasonic data. In one embodiment, the process of FIG. 5A is performed by the ultrasonic communication system 200, as described with respect to FIG. 2. In various embodiments, the method may include different or additional steps than those described below in conjunction with FIG. 5A. Additionally, in some embodiments, steps of the method may be performed in different orders than the order described in conjunction with FIG. 5A.

The ultrasonic communication system 200 receives 510 audio data. The ultrasonic communication system 200 may be part of a headset (e.g., the ultrasonic communication device 100) or some other device that receives the audio data. In some embodiments, the audio data may be received from an audio receiver as a microphone, such as, for example, speech data from a user of the device that is captured in real time by a microphone in the audio data transducer 210 (as described in conjunction with FIG. 2). In other embodiments, the audio data may be stored in the data store 240 of the ultrasonic communication system 200, and selected from the store by the acoustic controller 230 of the ultrasonic communication system 200.

The ultrasonic communication system 200 encodes 520 the received audio data into ultrasonic data in a frequency that is greater than 20 kHz. The ultrasonic encoding transforms received audio data into ultrasonic data in a manner that can subsequently be decoded losslessly or semi-losslessly. As described with respect to FIG. 2, the encoding may employ amplitude, frequency or phase modulation of the audio data using an ultrasonic carrier frequency, among other approaches. In some embodiments, the ultrasonic encoding may further involve encrypting the received audio data based on encryption keys that may be stored in the data store 240.

The ultrasonic communication system 200 transmits the encoded ultrasonic data. The transmission is localized and performed without the use of network resources linking the system 200 to a receiving device that has an ultrasonic communication system in a network system. In one embodiment, prior to transmitting the encoded ultrasonic data, system 200 may first transmit an ultrasonic informational beacon that includes communication channel information, encryption keys, transmission protocol information, access point information, etc. The encoded acoustic data that is subsequently transmitted by the system 200 may be encrypted based on the transmitted encryption keys, and transmission may be based on the channel, protocol and access point information included in the informational beacon.

In some embodiments, the ultrasonic communication system 200 transmits 530 the encoded ultrasonic data after determining that a receiving device, that has an ultrasonic communication system, is present within the transmission range. In one embodiment, determining that the receiving device is present within the transmission range may involve first receiving an indicator signal from the receiving device. In another embodiment, the system 200 may determine that a receiving device is present may be based on tracking data obtained from tracking module 270. In some embodiments, once a receiving device is located, the system 200 may use beamforming to transmit the encoded ultrasonic data towards the receiving device. Beamforming transmission may be performed by the ultrasonic data transducer 220 as described above in conjunction with FIG. 2.

In some embodiments, subsequent to tracking a device in the transmission range, the ultrasonic communication system 200 may query the user using the user interface 260 regarding transmitting encoded ultrasonic data. Transmission of the encoded ultrasonic data may be performed by the system 200 in response to a received user command.

FIG. 5B is a flowchart of one embodiment of a method for receiving encoded ultrasonic data. In one embodiment, the process of FIG. 5B is performed by the ultrasonic communication system 200 that is part of a receiving device, as described with respect to FIG. 2. In various embodiments, the method may include different or additional steps than those described below in conjunction with FIG. 5B. Additionally, in some embodiments, steps of the method may be performed in different orders than the order described in conjunction with FIG. 5B.

The ultrasonic communication system 200 receives 540 encoded ultrasonic data in frequencies greater than 20 kHz. The encoded ultrasonic data is received without a communication network link, either direct or indirect, to the transmitting device. The ultrasonic data is received at an ultrasonic data transducer 210, by a receiver such as a directional microphone array (as described in conjunction with FIG. 2).

In some embodiments, the system 200 may initially receive an informational beacon that may include communication channel information, encryption keys, transmission protocol information, access point information, etc. The subsequently received ultrasonic data may encode audio data, may be encrypted based on the encryption key data in the informational signal, and may be based on the channel, protocol and access point information included in the informational beacon. The system 200 may use the received communication channel information, transmission protocol information, and access point information etc. to receive 540 the ultrasonic data.

In some embodiments, the system 200 may receive the informational beacon as a response to a periodically transmitted indicator beacon to indicate its presence to any transmitting device within transmission range. In some embodiments, the indicator beacon may include information regarding values for desired settings, and the received ultrasonic data may be encoded specifically in response to the setting values.

In some embodiments, the ultrasonic data may be part of ultrasonic data encoded in multiple frequencies greater than 20 kHz and transmitted by a transmitting device that has an ultrasonic communication system. In these embodiments, a user of the receiving device may be presented with a user interface that offers a selection of settings. The selected settings received from the user may be used subsequently by the system 200 to tune the microphone array in the ultrasonic data transducer 220 to receive ultrasonic data of a particular frequency range.

The ultrasonic communication system 200 decodes 550 the received ultrasonic data into audio data in a frequency range that is between 20 Hz and 20 kHz. The decoding transforms the received ultrasonic data into audio energy losslessly or semi-losslessly. The decoding may be performed using demodulation of the received ultrasonic data based on standardized protocols. Furthermore, in some embodiments, the decoding may also involve decryption of the received data using the encryption information received in an informational beacon or using mutually known encryption-decryption schemes with keys that may be stored in the data store 240 of the system.

The ultrasonic communication system 200 presents 560 the decoded audio data to the device user in the form of an audio playback system using a loudspeaker array in the audio data transducer 210. In some embodiments, the presented audio data may be in the form of a looped message that presents the same message in a loop to the user. Some embodiments may store the decoded audio data in the data store 240 for later playback to the device user.

FIG. 6A is a flowchart of one embodiment of a method for establishing local connection between two ultrasonic communication devices. In one embodiment, the process of FIG. 6A is performed by the ultrasonic communication system 200, as described with respect to FIG. 2, using the handshake module 290. In various embodiments, the method may include different or additional steps than those described below in conjunction with FIG. 5A. Additionally, in some embodiments, steps of the method may be performed in different orders than the order described in conjunction with FIG. 5A.

The ultrasonic communication system 200 retrieves 610 network setup information. In one embodiment, the network setup information may, for example, be security tokens and near field communication (NFC) protocol information for establishing some form of NFC communication between two ultrasonic communication devices. The network setup information may be stored in the data store 240 of the ultrasonic communication system 200, and retrieved from the store by the acoustic controller 230 of the ultrasonic communication system 200.

The ultrasonic communication system 200 encodes 620 the received network setup information into ultrasonic data in a frequency that is greater than 20 kHz.

The ultrasonic communication system 200 transmits 630 the encoded ultrasonic data as a handshake beacon. The transmission is localized and performed without the use of network resources linking the system 200 to a receiving device that has an ultrasonic communication system in a network system. In some embodiments, the ultrasonic communication system 200 may transmit 630 the handshake beacon after determining that a receiving device, that has an ultrasonic communication system, is present within the transmission range. In one embodiment, determining that the receiving device is present within the transmission range may involve first receiving an indicator signal from the receiving device. In another embodiment, the system 200 may determine that a receiving device is present may be based on tracking data obtained from tracking module 270. In some embodiments, once a receiving device is located, the system 200 may use beamforming to transmit 630 the encoded handshake beacon towards the receiving device.

In some embodiments, subsequent to tracking a device in the transmission range, the ultrasonic communication system 200 may query the user using the user interface 260 regarding establishing a local NFC communication with another device. Retrieval of the network setup information and transmission of the encoded handshake beacon may be performed by the system 200 in response to a received user command.

FIG. 6B is a flowchart of one embodiment of a method for establishing local connection between two ultrasonic communication devices. In one embodiment, the process of FIG. 6B is performed by the ultrasonic communication system 200 that is part of a receiving device, as described with respect to FIG. 2. In various embodiments, the method may include different or additional steps than those described below in conjunction with FIG. 6B. Additionally, in some embodiments, steps of the method may be performed in different orders than the order described in conjunction with FIG. 6B.

The ultrasonic communication system 200 receives 640 encoded ultrasonic data as a handshake beacon in a frequency that is greater than 20 kHz. The encoded ultrasonic data is received without a communication network link, either direct or indirect, to the transmitting device. The ultrasonic data is received at the ultrasonic data transducer 210, using, for example, a directional microphone array (as described in conjunction with FIG. 2).

In some embodiments, the system 200 may receive the handshake beacon as a response to a periodically transmitted indicator beacon to indicate its presence to any transmitting device within transmission range. In some embodiments, the indicator beacon may include information regarding values for desired settings, and the received ultrasonic data may be encoded specifically in response to the setting values.

In some embodiments, a user of the receiving device may be presented with a user interface that offers prompts for accepting or declining the local NFC connection to another device. Upon receive an accept from the user of the receiving device, the ultrasonic communication system 200 may decode 650 the received ultrasonic data as network setup information.

The decoded network setup information may be used subsequently by the system 200 to establish a local connection with the transmitting device for sharing data, VOIP etc.

Advantages of the Ultrasonic Communication System

The ultrasonic communication system described herein offers several advantages for communication. It facilitates communication between users who do not have network communication resources such as internet, wireless, or cellular networks available to communicate. It facilitates customized one-to-many multicast communication. It enables transmission of information privately, using encryption technology, and by facilitating directional ultrasonic data transmission using beamforming to target an intended recipient. The location of an intended recipient may be determined by the transmitting device using tracking modules within the ultrasonic communication system. The beamforming also limits the recipient, filtering out device users who may not be intended recipients of the transmitted acoustic data. It enables customization by facilitating transmission of multiple encoded ultrasonic data simultaneously, while ensuring that a user of a receiving device only receives intended or desired audio data.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A non-transitory computer-readable storage medium comprising stored instructions, the instructions when executed by a processor of a first ultrasonic communication device, causing the first ultrasonic communication device to:

encode audio data that is in a human audible frequency into ultrasonic data in an ultrasonic frequency; and transmit, in response to an indicator signal that indicates a presence of a second ultrasonic communication device within a local area, the ultrasonic data into the local area, wherein the second ultrasonic communication device decodes the ultrasonic data to retrieve the audio data and presents the audio data.

2. The computer-readable storage medium of claim 1, further comprising stored instruction that when executed cause the first ultrasonic communication device to:
transmit an informational ultrasonic beacon with information comprising one or more of:
communication channel information,
one or more encryption keys,
transmission protocol information,
encoding protocol information, and
access point information.

3. The computer-readable storage medium of claim 1, where the stored instructions to transmit the ultrasonic data into the local area further comprises stored instruction that when executed causes the first ultrasonic communication device to:
track a location of the second ultrasonic communication device;
transform the ultrasonic data via beamforming; and
transmit the beamformed ultrasonic data towards the tracked location.

4. The computer-readable storage medium of claim 1, further comprising stored instruction that when executed cause the first ultrasonic communication device to:
capture speech by one or more microphones of the first ultrasonic communication device; and
generate the audio data using the captured speech.

5. The computer-readable storage medium of claim 1, wherein the ultrasonic data is stored along with a plurality of ultrasonic data, wherein the indicator signal further comprises values for one or more selected settings, and wherein the values for the one or more settings are used to select the ultrasonic data from the plurality of stored ultrasonic data for the transmission.

6. The computer-readable storage medium of claim 1, wherein the human audible frequency is in a frequency range of 20 Hz to 20 kHz, wherein the ultrasonic frequency is a frequency that is greater than 20 kHz, and wherein the first ultrasonic communication device transmits the ultrasonic data without an uplink to the second ultrasonic communication device.

7. A non-transitory computer-readable storage medium comprising stored instructions, the instructions when executed by a processor of a second ultrasonic communication device, causing the second ultrasonic communication device to:
decode ultrasonic data received from a first ultrasonic communication device into audio data in a human audible frequency, the decoding based in part on a received informational ultrasonic beacon with information comprising one or more of:
communication channel information,
one or more encryption keys,
transmission protocol information,
encoding protocol information, and
access point information; and
present, the audio data to a user, wherein the first ultrasonic communication device initially encoded the audio data into the ultrasonic data.

8. The computer-readable storage medium of claim 7, further comprising stored instruction that when executed cause the second ultrasonic communication device to:
transmit an indicator signal indicating a presence of the second ultrasonic communication device within a predefined area, wherein the ultrasonic data is received in response to the transmitted indicator signal.

9. The computer-readable storage medium of claim 7, wherein the presented audio data is speech data from a user of the first ultrasonic communication device.

10. The computer-readable storage medium of claim 7, wherein the ultrasonic data comprises a plurality of ultrasonic data.

11. The computer-readable storage medium of claim 10, further comprising stored instruction that when executed cause the second ultrasonic communication device to:
present a user interface offering one or more settings for selection by a user of the second ultrasonic communication device; and
decode one or more of the plurality of ultrasonic data based on a selection of a setting of the one or more settings.

12. The computer-readable storage medium of claim 7, wherein the human audible frequency is in a frequency range of 20 Hz to 20 kHz, wherein the ultrasonic frequency is a frequency that is greater than 20 kHz, and wherein the second ultrasonic communication device receives the ultrasonic data without an uplink to the first ultrasonic communication device.

13. A method comprising:
encoding, at first ultrasonic communication device, audio data that is in a human audible frequency into ultrasonic data in an ultrasonic frequency; and
transmitting, in response to an indicator signal that indicates a presence of a second ultrasonic communication device within a local area, the ultrasonic data into the local area, wherein the second ultrasonic communication device decodes the ultrasonic data to retrieve the audio data and presents the audio data.

14. The method of claim 13, further comprising:
transmitting an informational ultrasonic beacon with information comprising one or more of:
communication channel information,
one or more encryption keys,
transmission protocol information,
encoding protocol information, and
access point information.

15. The method of claim 13, wherein transmitting the ultrasonic data into the local area further comprises:
tracking a location of the second ultrasonic communication device;
transforming the ultrasonic data via beamforming; and
transmitting the beamformed ultrasonic data towards the tracked location.

16. The method of claim 13, further comprising:
capturing speech by one or more microphones of the first ultrasonic communication device; and
generating the audio data using the captured speech.

17. The method of claim 13, wherein the ultrasonic data is stored along with a plurality of ultrasonic data, wherein the indicator signal further comprises values for one or more selected settings, and wherein the values for the one or more settings are used to select the ultrasonic data from the plurality of stored ultrasonic data for the transmission.

18. The method of claim 13, wherein the human audible frequency is in a frequency range of 20 Hz to 20 kHz, wherein the ultrasonic frequency is a frequency that is greater than 20 kHz, and wherein the first ultrasonic communication device transmits the ultrasonic data without an uplink to the second ultrasonic communication device.

19. The method of claim 13, wherein the first ultrasonic communication device is a headset.

* * * * *